United States Patent
Suau et al.

(10) Patent No.: US 10,207,446 B2
(45) Date of Patent: Feb. 19, 2019

(54) CONTINUOUS ESTERIFICATION AND/OR AMIDIFICATION METHOD, WITHOUT ORGANIC SOLVENT, OF AN ACID HOMOPOLYMER OR COPOLYMER

(71) Applicant: COATEX, Genay (FR)

(72) Inventors: Jean-Marc Suau, Lucenay (FR); David Platel, Saint Maurice de Gourdans (FR); Clementine Champagne, Caluire-et-Cuire (FR); Yves Matter, Quincieux (FR)

(73) Assignee: COATEX, Genay (FR)

( * ) Notice: Subject to any disclaimer, the term of this patent is extended or adjusted under 35 U.S.C. 154(b) by 16 days.

(21) Appl. No.: 15/516,733

(22) PCT Filed: Dec. 7, 2015

(86) PCT No.: PCT/FR2015/053349
§ 371 (c)(1),
(2) Date: Apr. 4, 2017

(87) PCT Pub. No.: WO2016/092190
PCT Pub. Date: Jun. 16, 2016

(65) Prior Publication Data
US 2017/0297255 A1 Oct. 19, 2017

(30) Foreign Application Priority Data

Dec. 8, 2014 (FR) ..................... 14 62027

(51) Int. Cl.
| | | |
|---|---|---|
| C08F 8/14 | (2006.01) | |
| C08F 8/32 | (2006.01) | |
| C08F 265/02 | (2006.01) | |
| B29C 47/80 | (2006.01) | |
| C04B 24/26 | (2006.01) | |
| C08G 81/02 | (2006.01) | |
| C08L 71/02 | (2006.01) | |
| C04B 28/04 | (2006.01) | |
| B29C 47/40 | (2006.01) | |
| B29C 47/92 | (2006.01) | |
| C08K 5/18 | (2006.01) | |
| C08L 33/02 | (2006.01) | |
| B29B 7/38 | (2006.01) | |
| C04B 103/32 | (2006.01) | |
| C04B 103/00 | (2006.01) | |
| C04B 103/30 | (2006.01) | |
| C04B 103/40 | (2006.01) | |

(52) U.S. Cl.
CPC .......... *B29C 47/807* (2013.01); *B29C 47/402* (2013.01); *B29C 47/92* (2013.01); *C04B 24/2647* (2013.01); *C04B 28/04* (2013.01); *C08G 81/025* (2013.01); *C08K 5/18* (2013.01); *C08L 33/02* (2013.01); *C08L 71/02* (2013.01); *B29B 7/38* (2013.01); *B29C 2947/92704* (2013.01); *C04B 2103/006* (2013.01); *C04B 2103/30* (2013.01); *C04B 2103/32* (2013.01); *C04B 2103/40* (2013.01); *C08G 2261/128* (2013.01); *C08L 2205/05* (2013.01)

(58) Field of Classification Search
CPC ...................................................... C08G 63/12
See application file for complete search history.

(56) References Cited

U.S. PATENT DOCUMENTS

| | | | | |
|---|---|---|---|---|
| 5,703,167 A | 12/1997 | Ohmae et al. | | |
| 7,592,413 B2 * | 9/2009 | Citron | ................. | C08G 63/605 528/271 |
| 8,742,027 B2 * | 6/2014 | Moro | .................... | C08F 220/28 524/556 |
| 2010/0273923 A1 * | 10/2010 | Suau | ....................... | A61K 8/91 524/145 |
| 2013/0123436 A1 * | 5/2013 | Rand | ....................... | C08F 20/08 525/385 |
| 2013/0274368 A1 * | 10/2013 | Krull | ...................... | B01J 19/126 522/129 |
| 2014/0039098 A1 * | 2/2014 | Chougrani | ............ | C04B 24/243 524/5 |

FOREIGN PATENT DOCUMENTS

| | | |
|---|---|---|
| EP | 0 669 364 A1 | 8/1995 |
| FR | 2 866 891 A1 | 9/2005 |
| WO | WO 2009/090471 A1 | 7/2009 |

OTHER PUBLICATIONS

Doctoral Dissertation by David Sujay Kingsley, Dec. 2014.*
International Search Report dated Feb. 25, 2016 in PCT/FR2015/053349 filed Dec. 7, 2015.

* cited by examiner

*Primary Examiner* — Vu A Nguyen
(74) *Attorney, Agent, or Firm* — Oblon, McClelland, Maier & Neustadt, L.L.P.

(57) ABSTRACT

The present invention relates to a continuous process for preparing a comb polymer, without organic solvent, by esterification and/or amidification of an acidic homopolymer or copolymer, which consists in performing the esterification and/or amidification of said homopolymer/copolymer by reaction at elevated temperature in the mixing and transportation zone of a tubular reactor, optionally equipped with a water removal system, in the presence of at least one poly(alkylene glycol) in solid or molten form and of an antioxidant, said esterification and/or amidification taking place at a temperature greater than or equal to 170° C.

17 Claims, No Drawings

CONTINUOUS ESTERIFICATION AND/OR AMIDIFICATION METHOD, WITHOUT ORGANIC SOLVENT, OF AN ACID HOMOPOLYMER OR COPOLYMER

FIELD OF THE INVENTION

The present invention relates to the technical field of processes for the continuous esterification and/or amidification of polymers, for providing acidic acrylic polymers comprising at least one side chain of poly(alkylene glycol) type.

BACKGROUND OF THE INVENTION

Acidic acrylic copolymers comprising at least one side chain of poly(alkylene glycol) type are occasionally referred to as polymers of comb structure. These are copolymers with a backbone of essentially carboxylic nature onto which are grafted side chains (also known as "pendant chains") of poly(alkylene glycol) type.

There are at the present time two main routes for preparing these copolymers of comb structure.

The first route for synthesizing these copolymers is copolymerization in the presence of acidic acrylic monomers and polymerizable macromonomers comprising poly(alkylene glycol) chains.

The second route for preparing copolymers of comb structure is the esterification and/or amidification of acidic acrylic polymers with poly(alkylene glycols). According to this route, an acidic acrylic polymer is prepared via conventional polymerization techniques, for example radical polymerization, followed by esterification and/or amidification of this acidic acrylic polymer in the presence of poly(alkylene glycol) compounds. The esterification and amidification processes described in the prior art (for example WO 2007/132 322, WO 2009/090 471, WO 2013/021 029, US 2008/0 119 602) are of discontinuous type with long reaction times.

US 2013/0 274 368 describes a process for esterification of a poly(carboxylic acid) polymer using polyether compounds, said process being of continuous type in an organic solvent and exposing the reagents to microwaves so as to initiate and accelerate the reaction.

The process of the present invention is based on the use of a continuous reactor known as a tubular reactor, for example an extruder. In a tubular reactor, the material may be subjected for a very short time to high temperatures (for example from 100 to 300° C.), with possibilities also of applying high local pressures (50 to 150 bars). The tubular reactor may moreover be equipped with devices for ensuring homogeneity of the molten material during its flow. Extruders are generally used in continuous processes for transforming, for example forming, thermoplastic polymers or thermosetting polymers. During these extrusion and injection processes, the polymers are completely melted so as to give them the desired shape and appearance to obtain the article to be manufactured. Driven by the screws, the material is subjected for a very short time to high temperatures (for example from 100 to 300° C.), to high local pressures (50 to 150 bars) and to a very intense shear. Extrusion is especially suitable for strong materials with a high melting point.

Tubular reactors, such as extruders, may also be used for chemically modifying the molten material. The use of an extruder for performing a chemical reaction is known as reactive extrusion (REX). Specifically as a result of its intrinsic characteristics (temperature, pressure, shear), extrusion offers a suitable solution for reacting two polymer materials, which are otherwise inert or harldy reactive.

Reactive extrusion is moreover described in the context of aqueous radical polymerization. Reference may be made especially to WO 99/58576, which describes solution polymerization for obtaining an acrylic/acrylamide copolymer in the form of a highly crosslinked gel having the consistency of rubber, containing at the core of its three-dimensional network approximately 50% to 70% by weight of water.

Thus, the use of reactive extrusion is described for preparing polymers from raw materials that are relatively insensitive to thermal degradation.

Polymers of poly(alkylene glycol) type, for example poly(ethylene glycol) or PEG, are heat-sensitive. Degradation of these polymers, under the effect of heat, by oxidative decomposition, leads to byproducts such as water, $CO_2$, aldehyde, simple alcohols, acids, glycol esters and vinyl byproducts.

This is likewise the case for polymers of comb type made of pendant chains of poly(alkylene glycol) type. The high temperatures may lead to side reactions, for example release of the pendant chains of the comb polymer and unexpected crosslinking, and thus degrade the quality of the polymer obtained. Substantial crosslinking may also lead to gelation of the whole, to polymers that are finally water-insoluble.

BRIEF DESCRIPTION OF THE INVENTION

One object of the present invention is to propose a process for preparing polymers of comb type made of pendant chains of poly(alkylene glycol) type by esterification and/or amidification of an acidic polymer using poly(alkylene glycol) compounds, said process being of continuous type and at high temperatures. The use of such high temperatures makes it possible to reduce the residence time in the reactor. In so doing, the production cost of such polymers is reduced and the regularity of the products is increased. Moreover, the operating conditions of the process are such that the degree of degradation of the side chains and the degree of crosslinking are very low. This makes it possible to obtain polymers of high homogeneity, having a low polymolecularity index, and thus polymers of better quality.

Such a continuous process is very advantageous from an industrial viewpoint. It makes it possible to considerably reduce the reaction time, and thus to increase the production profitability. Moreover, such a process is more flexible since the use of a tubular reactor, such as an extruder, makes it possible to adjust the operating conditions in the course of the process, much more quickly than in a batch or semi-batch process. Given that the total volume is spread over the length of the reactor and possibly in reaction zones that have different temperatures, the volume of reagents to be brought to the desired temperature (at least 170° C. in the case of the present invention) is much smaller than that of a reactor of batch or semi-batch type and thus requires less time to perform regulations and temperature corrections. The continuous system thus has greater reactivity than systems of noncontinuous type. Such a process thus makes it possible, for example, to set the esterification and/or amidification yield as a function of the desired degree of grafting on the polymer of comb type, much more easily.

Such a process now makes it possible to obtain an excellent productivity-quality ratio.

DETAILED DESCRIPTION OF THE INVENTION

Esterification and/or Amidification Process

One subject of the present invention consists of a continuous process for preparing a comb polymer, without organic solvent, by esterification and/or amidification of an acidic homopolymer or copolymer, which consists in performing the esterification and/or amidification of said homopolymer/copolymer by reaction at elevated temperature in the mixing and transportation zone of a tubular reactor, such as an extruder, optionally equipped with a water removal system, in the presence of at least one poly(alkylene glycol) in solid form or in molten form and of an antioxidant, said esterification and/or amidification taking place at a temperature of greater than or equal to 170° C., optionally in the presence of an esterification and/or amidification catalyst, optionally at reduced pressure and/or under a stream of inert gas.

In one embodiment, the mixing zone comprises homogenization of the mixture.

In one embodiment, the esterification and/or amidification of said homopolymer/copolymer is performed by kneading at elevated temperature in the mixing and transportation zone of the extruder, optionally equipped with a water removal system, said esterification and/or amidification taking place at a temperature greater than or equal to 170° C., optionally in the presence of an esterification and/or amidification catalyst, optionally at reduced pressure and/or under a stream of inert gas.

Such a process makes it possible to obtain a polymer of comb structure, also known as a "comb polymer". These are polymers or copolymers having a backbone of carboxylic nature onto which are grafted side chains (also known as "pendant chains") of poly(alkylene glycol) type. These side chains are occasionally referred to as polyoxyalkyl side groups.

Depending on the degree of grafting of the final polymer, the acid backbone, for example of carboxylic nature, may have a more or less pronounced anionic charge. If the degree of esterification and/or amidification is close to 100%, this means that a large proportion of the acid functions of the acidic polymer, for example the carboxylic groups of an acidic acrylic polymer, have undergone an esterification and/or amidification reaction and the backbone of the final polymer is very low anionically charged. The degree of esterification and/or amidification of the comb polymer obtained may be determined, for example, by titrating the acid functions (for example, the acid index in mg KOH/g). These acid functions, for example carboxylic groups, may be in free acid or acid anhydride form or in partially neutralized form. The mole proportion of free acid functions and of functions in acid anhydride form in the final comb polymer may range from 0 to 99%, for example from 5 to 60%.

One advantage of the process of the present invention is that the degree of esterification and/or amidification can be readily adjusted as a function of the needs. To do this, it is possible to adjust the residence time and/or mole ratio parameters of the constituents entering the reactor.

In the context of the present invention, said comb polymer obtained via the process of the present invention advantageously has an acid index of between 35 and 234 mg KOH/g (mass of potash, expressed in mg, required to neutralize the acidity of one gram of polymer).

According to one embodiment, said comb polymer obtained via the process of the present invention has an acid index of between 46 and 156 mg KOH/g.

The process of the present invention is performed continuously.

Thus, the introduction of the constituents into the tubular reactor, for example the extruder, takes place "in a continuous manner", i.e. at a constant or variable rate, but without stopping the introduction.

According to one embodiment of the process of the present invention, the introduction of the constituents into the synthesis reactor takes place "simultaneously", i.e. the various constituents are introduced concomitantly.

According to another embodiment of the process of the present invention, the introduction of the constituents into the synthesis reactor takes place "proportionately", i.e. the proportion of each constituent of the mixture introduced into the synthesis reactor remains constant in the course of the reaction time, with respect to the other constituents of the mixture.

According to one embodiment of the process of the present invention, the constituents are introduced into the tubular reactor in the form of a homogeneous mixture.

According to one embodiment of the process of the present invention, the mixture of constituents is homogenized on entering the reactor.

The process of the present invention is performed without organic solvent. Specifically, processes using solvents generate volatile organic compounds (VOC). Firstly, it is necessary to remove these solvents at the end of the reaction, the effect of which is to complicate the industrial process for preparing the polymer. Secondly, the effects on health and on the environment of these solvents are known as being very detrimental, and as such it is sought to avoid producing them. Finally, even after purification (distillation), there still remains traces of solvent in the polymers obtained.

The term "solvent" means any substance that is inert with respect to the reagents and the reaction products, which is in the liquid phase at its working temperature, and whose function is to dilute other substances without chemically modifying them and without being modified itself In addition, the removal of these solvents gives rise to additional costs.

The process of the invention is performed at high temperatures, the esterification and/or amidification of the homopolymer/copolymer taking place at a temperature greater than or equal to 170° C.

The inventors in fact realized that this temperature made it possible to obtain the best ratio in terms of process time (residence time in the tubular reactor, for example in the extruder)—process costs—quality of the comb polymer thus obtained (grafting rate).

According to one embodiment of the present invention, the esterification and/or amidification of the homopolymer/copolymer takes place at a temperature greater than or equal to 180° C., for example greater than or equal to 200° C., 210° C. or 220° C.

The product obtained at the tubular reactor outlet, for example at the extruder outlet, may be in the form of a resin (high temperature at the tubular reactor outlet, for example at the extruder outlet) or a wax (temperature at the tubular reactor outlet, for example the extruder outlet, below the melting point of the comb polymer obtained). In this case, the product has a very high solids content, for example greater than 90%, or, for example, greater than 95% by weight. Such a product may then be transformed, for example ground, to be in the form of a solid powder, flakes, pellets, rods, granules, etc.

Alternatively, the product obtained at the tubular reactor outlet, for example the extruder outlet, may be dissolved at the end of the reaction, by adding water, and optionally an alkali. The amount of water added to the product of the esterification and/or amidification reaction is adjusted to obtain a solution with a defined active material content. Thus, the process of the present invention makes it possible to obtain a product with a high solids content, for example greater than 60% of its weight, while at the same time conserving its liquid nature, i.e. it is perfectly handled and especially pumpable by astutely selecting the composition of the side chains of poly(alkylene glycol) type. In this regard, reference is made, for example, to WO 2011/104 590 A1 (Coatex) which shows that, for a poly(alkylene glycol) of given molecular weight, it is possible to adjust the manipulable nature of the solutions obtained as a function of the number of propylene oxide units relative to the total number of alkylene glycol units of the poly(alkylene glycol).

Depending especially on the transportation constraints, it may prove advantageous to be able alternatively to propose a product in powder form or in the form of a solution whose solids content has been adjusted. The process of the present invention allows such flexibility.

As explained above, the reaction product may be dissolved and/or neutralized. The neutralizing agent is chosen so that the counterion present in the polymeric solution after neutralization is chosen, for example, from the group consisting of the calcium ion, the sodium ion, the potassium ion, the lithium ion, the magnesium ion, the barium ion, the zinc ion, the aluminum ion, the ammonium ion and an amine (for example 2-amino-2-methylpropanol, triethanolamine, etc.).

The neutralization of the polymer obtained may be total or partial.

The mole percentage of neutralization of the active acid sites of the polymer with a neutralizing agent may range, for example, between 10% and 90%, for example between 15% and 85%.

The neutralization of the polymer obtained may also be simple (a single neutralizing agent) or multiple (several neutralizing agents).

For example, it is possible to envisage the following modes of neutralization, alone or in combination:
- a mole percentage of neutralization of the active acid sites of the polymer with a neutralizing agent containing the calcium ion of between 15% and 40%, for example between 20% and 35%,
- a mole percentage of neutralization of the active acid sites of the polymer with one or more monofunctional neutralizing agents containing the sodium ion of between 7% and 70%, for example between 20% and 60%,
- a mole percentage of neutralization of the active acid sites of the polymer with a neutralizing agent containing the magnesium, barium, zinc or aluminum ion or an amine or mixtures thereof and in particular with a neutralizing agent containing the magnesium ion of between 0% and 30%, for example between 5% and 25%.

Tubular Reactor

The process of the invention is based on the use of a continuous reactor known as a tubular reactor. The term "esterification reactor" or the term "amidification reactor" are also used equivalently.

In the context of the present invention, the term "tubular reactor" defines a chamber, for example a cylindrical chamber, which is preferentially closed, equipped with at least one inlet orifice at one end of the chamber and with at least one outlet orifice at the opposite end of the chamber. It may be considered, for example, that an empty cylindrical tube is a tubular reactor. It should be noted that the chamber may be rectilinear, but is not necessarily so. The terms "tubular reactor" or "piston reactor" may be used alternatively. In this case, it is incorrectly assumed that the flow in said reactor is of piston type, i.e. the distribution of the residence times in the reactor is monomodal with a very low dispersion. Said reactor may or may not be equipped with devices, for example mechanical devices, for ensuring homogenization of the fluid during its flow. When mechanically driven screws are used, the tubular reactor is an extruder as described below. However, the mixing in the tubular reactor may also result from the use of immobile parts, for example static mixers. Mixing devices of this type are sold by several companies, including JLS, Samwha, Mixel, Horus-Environment or Sulzer Ltd. The mixers of SMX, SMV and SMI type from this company are examples of equipment that can fulfill the mixing functions.

The tubular reactor may be made of one, several or even numerous segments connected in series. The length of said reactor may thus readily be varied.

The tubular reactor is preferentially equipped with one or more devices for introducing or withdrawing reagents or products. Pumps may thus be connected to said tubular reactor, for example.

The tubular reactor may also be equipped with adjustment systems for regulating its internal temperature. Use may be made, for example, of a jacket system in order to circulate a heat-transfer fluid in the wall of the reactor. A heat-transfer fluid may also be circulated in an exchanger system within the reactor itself. Static mixers exist whose form is such that they also act as mixing devices.

The tubular reactor may also be equipped with adjustment systems for regulating its positive pressure/negative pressure. By astutely equipping the reactor with stopcocks, valves and spillways, it is possible to work either at atmospheric pressure or at a negative pressure or at a positive pressure.

Use may be made, for example, of a tubular reactor composed of metal tubes linked together by a system of joints and collars which ensure perfect leaktightness of the system. For a reactor composed of 10 grade-316 stainless-steel tubes thus assembled, with a unit length of 2 meters, and thus a total length of the assembly of 20 meters, with tubes of "DN15" type having an outside diameter of 21.3 mm and a thickness of 1.6 mm and with a first tube equipped with a combination of static mixers of SMX type and of SMV type (Sulzer brand) which ensure good mixing of the reagents after their introduction, the residence time may be about 30 minutes with an overall flow rate adjusted to 10 kg/h.

For a reactor composed of 10 tubes thus assembled with a unit length of 1 meter, and thus a length of the assembly of 10 meters, with tubes of "DN35" type having an outside diameter of 42.4 mm and a thickness of 2 mm and with a first tube equipped with a combination of static mixers of SMX type and of SMV type (Sulzer brand) which ensure good mixing of the reagents after their introduction, a second tube equipped with mixers of helical type, generating a rotational circulation and making it possible to ensure better homogenization of the reagents and products, the residence time may be about 20 minutes with an overall flow rate adjusted to 35 kg/h.

In one embodiment, the tubular reactor is an extruder.

Extruder

The process of the invention is based on the use of a tubular reactor such as an extruder.

In the context of the present invention, the term "extruder" defines: a chamber, for example a cylindrical chamber, which is preferentially closed, equipped with at least one inlet orifice at one end of the chamber and at one outlet orifice at the opposite end of the chamber, and which comprises a mixing zone, a transportation zone, and optionally one or more screws. It should be noted that the chamber may be rectilinear, but this is not necessarily the case. The term "blender" may alternatively be used when said extruder does not comprise a transportation screw.

The extruder may be formed from one or more tubular segments connected in series.

The extruder allows kneading at elevated temperature in the mixing zone of the raw materials introduced into the chamber, followed by transportation to the outlet orifice. The extruder is preferentially equipped with at least one water removal system. The extruder may be equipped with several water removal systems arranged at multiple points on the chamber. These water removal systems allow water to be removed, which moreover has the effect of shifting the reaction equilibrium and thus facilitating the esterification/amidification reaction of the acidic homopolymer/copolymer, for example of the (meth)acrylic acid polymer.

Using an extruder comprising at least one water removal system may also prove advantageous since, in this case, the product obtained at the end of the esterification and/or amidification reaction has a high solids content, for example greater than 90% by weight. It may be envisaged to conserve such a solids content and to transform, for example, the product in the form of a solid powder, granules, etc. (reduction of the temperature below the melting point of the polymer followed by grinding/crushing/spraying). Alternatively, the product obtained at the end of the esterification/amidification reaction is dissolved to have a product in liquid form. The dissolution may take place in the extruder, which is then equipped with a water inlet, for example. The dissolution may also be physically separate from the extruder.

The extruder may also be equipped with adjustment systems for regulating, for example, the temperature, the pressure and the rates of the various reagents. Moreover, the extruder may also be equipped with one or more cooling systems.

The starting acidic homopolymer and/or copolymer bears acid functions, for example carboxylic functions, which are the site of esterification/amidification reactions during the process according to the invention. The proportion of acid functions in the polymer may be evaluated by measuring the acid index of the polymer. As the number of acid functions decreases during the process of the invention, the variation in the acid index of the polymer makes it possible to monitor the degree of progress of the reaction. Concretely, the acid index may be determined by acid-base metering using, for example, an aqueous solution of KOH or NaOH (mass of KOH or of NaOH, expressed in mg, required to neutralize the acidity of one gram of polymer).

According to one aspect of the present invention, said extruder comprises at least one screw, for example two screws.

According to another aspect of the present invention, said tubular reactor, in particular said extruder, comprises several reaction zones having different temperatures ranging between room temperature and 250° C., at least one reaction zone of which having a temperature of greater than or equal to 170° C.

For example, said tubular reactor, in particular said extruder, comprises three reaction zones with incremental temperatures ranging between room temperature (e.g. 20-25° C.) and 250° C., one reaction zone of which having a temperature of greater than 180° C. Such a configuration allows the introduction of the reagents into the tubular reactor, for example the extruder, without prior heating thereof.

Examples of extruders that are suitable for the process of the present invention are given in the document FR 2 993 887.

The use of a tubular reactor, in particular of an extruder, makes it possible to bring the reagents rapidly to the esterification and/or amidification temperature. The preheating and then cooling times, which are generally long in batch processes, are reduced or even negligible in the context of the present invention. Now, these preheating and cooling times generally correspond to uncertainties regarding the quality of the polymer obtained. By reducing the preheating times, the risks associated with these periods of uncertainty are proportionately reduced.

According to one embodiment of the process of the present invention, the residence time in said tubular reactor, in particular the extruder, is greater than or equal to 4 minutes, for example between 4 to 40 minutes or between 6 to 30 minutes, depending on the number of conveying screws present in said tubular reactor, in particular the extruder.

Acidic Homopolymer/Copolymer

According to one aspect of the present invention, said acidic homopolymer or copolymer to be esterified and/or amidated results from the polymerization or copolymerization of at least one of the monomers chosen from the group consisting of acrylic acid, methacrylic acid, itaconic acid, crotonic acid, fumaric acid and maleic anhydride.

According to another aspect of the present invention, said acidic homopolymer or copolymer to be esterified and/or amidated results from the polymerization or copolymerization of a monomer represented by formula (1):

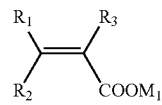

in which:
$R_1$, $R_2$ and $R_3$ represent, independently of each other, a hydrogen atom, a methyl group or $(CH_2)_z$—$COOM_2$, $(CH_2)_z$—$COOM_2$ possibly forming an anhydride together with —$COOM_1$ or another $(CH_2)_z$—$COOM_2$ and, in this case, $M_1$ and $M_2$ are not present and z=0, 1 or 2, $M_1$ and $M_2$ represent, independently of each other, a hydrogen atom, a metal atom, an ammonium group or an organic amine group.

According to yet another aspect, said homopolymer or copolymer to be esterified and/or amidated is of acrylic acid type and results from the polymerization or copolymerization of acrylic acid and/or methacrylic acid.

According to one aspect of the present invention, said homopolymer or copolymer to be esterified and/or amidated is essentially linear. In this case, the linking of the monomer units takes place linearly, but may have a few random or regular branches.

Said acidic homopolymer or copolymer may be obtained via any radical polymerization process, for example in solution, in direct or inverse emulsion, in suspension or precipitation in suitable solvents, in the presence of catalytic systems and transfer agents. Use is made of monofunctional or multifunctional chain-transfer agents. It may be a radical polymerization process controlled, for example, with nitroxides (NMP) or cobaloximes, or an atom-transfer radical polymerization (ATRP) process. Mention is also made of radical polymerization processes controlled with sulfur derivatives, chosen from carbamates, dithioesters, trithiocarbonates (RAFT) and xanthates.

Use may be made, for example, of hydrogen peroxide or a persulfate which acts as initiator, and also, for example, of copper sulfate which acts as catalyst and chain-transfer agent.

Alternatively, thiolactic acid is used, or another mercaptan bearing one or more SH functions, as additional chain-transfer agent.

Yet other processes make use of sodium hypophosphite, of chemical formula $NaPO_2H_2$, as chain-transfer and redox agent, in the presence of hydrogen peroxide or of a radical generator such as persulfate.

In this regard, reference is made especially to the following documents which describe various processes for the radical polymerization of acrylic acid: WO 02/070 571, WO 2005/095 466, WO 2006/024 706, WO 2014/049 252.

Said acidic homopolymer or copolymer may be in the form of an aqueous solution or in dry form.

Said acidic homopolymer or copolymer may be in totally acidic or partially neutralized form. The mole percentage of neutralization of the active acid sites of said acidic homopolymer or copolymer to be esterified and/or amidated, with a neutralizing agent, may be, for example, less than or equal to 90%, for example less than or equal to 80%, or less than or equal to 70%.

If the polymer to be esterified and/or amidated is partially neutralized, this may be done using a single neutralizing agent or several neutralizing agents. For example, it is possible to envisage the following neutralization modes, alone or in combination:

a mole percentage of neutralization of the active acid sites of the polymer with a neutralizing agent containing the calcium ion of between 15% and 40%, for example between 20% and 35%, a mole percentage of neutralization of the active acid sites of the polymer with one or more monofunctional neutralizing agents containing the sodium ion and/or the lithium ion of between 7% and 70%, for example between 20% and 60%, a mole percentage of neutralization of the active acid sites of the polymer with a neutralizing agent containing the magnesium, barium, zinc or aluminum ion or a difunctional amine or mixtures thereof and in particular with a neutralizing agent containing the magnesium ion of between 0% and 30%, for example between 5% and 25%.

The polymers, especially the acidic polymers of the present invention, may be characterized by the following two indices:

the polymolecularity index IP (also known equivalently as the polydispersity (PD); and the weight molecular mass.

The polymolecularity index corresponds to the distribution of the molecular masses of the various macromolecules in the polymer. If all the macromolecules have the same degree of polymerization (and thus the same molecular mass), this index is close to 1. If, on the other hand, the macromolecules have different lengths (and thus different molecular masses), the IP index is greater than 1.

According to one aspect of the present invention, said acidic homopolymer or copolymer to be esterified and/or amidated has a polydispersity index IP (Mw/Mn ratio) of between 1 and 3, for example between 1.5 and 3 or between 2 and 2.5.

The molecular mass Mw of such polymers may be determined, for example, by size exclusion chromatography (SEC) or gel permeation chromatography (GPC).

According to one aspect of the present invention, said acidic homopolymer or copolymer to be esterified and/or amidated is an acrylic acid and/or methacrylic acid polymer with a molecular weight Mw of between 1000 and 20 000 g/mol, as determined by GPC, for example between 1000 and 15 000 g/mol, between 1000 and 10 000 g/mol or between 1500 and 8000 g/mol.

According to yet another aspect of the present invention, said acidic homopolymer or copolymer to be esterified and/or amidated has a molecular mass of less than 8000 g/mol and a polydispersity index IP of between 2 and 3.

Said acidic homopolymer or copolymer to be esterified and/or amidated may be characterized by its acid index. This acid index may especially correspond to the presence of carboxylic groups.

In the context of the present invention, said comb polymer obtained via the process of the present invention has an acid index advantageously of between 35 and 234 mg KOH/g (mass of potash, expressed in mg, required to neutralize the acidity of one gram of polymer).

According to one embodiment, said comb polymer obtained via the process of the present invention has an acid index of between 46 and 156 mg KOH/g.

Poly(alkylene glycol) Compounds

In the context of the present invention, one or more poly(alkylene glycol) compounds are used.

The term "poly(alkylene glycol)" (abbreviated as PAG) or, equivalently, "poly(oxyalkylene)" (abbreviated as POA) means a compound made of a polymer chain made of alkylene oxide units, for example ethylene oxide, propylene oxide or 1-butylene oxide. Such compounds are commercially available and obtained by polymerization of the corresponding epoxides.

In the context of the present invention, the poly(alkylene glycol) compounds are advantageously monofunctional, i.e. they comprise:

at one of their ends, a reactive function of —OH or —NHR type (in which R represents H or a hydrocarbon-based chain comprising from 1 to 10 carbon atoms), and at the other of their ends, a hydrocarbon-based chain comprising from 1 to 100 carbon atoms, for example from 1 to 70, from 1 to 50, from 1 to 30 or from 1 to 10 carbon atoms.

In this case, when said monofunctional poly(alkylene glycol) comprises an —OH end, the terms "alkoxy poly (oxyalkylene glycol)" or "poly(alkylene glycol) monoalkyl ether" may also be used. Such a monofunctional compound is grafted onto the acidic polymer by esterification.

When said monofunctional poly(alkylene glycol) comprises an —NHR end, the terms "α-amino-alkoxy-poly (oxyalkylene glycol)" or "α-amino-alkylether-poly(alkylene glycol)" may also be used. Such a monofunctional compound is grafted onto the acidic polymer by amidification.

Use may also optionally be made of at least one other poly(alkylene glycol) compound and this compound may also be monofunctional or alternatively it may be difunctional, i.e. it may comprise a reactive function of —OH or —NHR type (in which R represents H or a hydrocarbon-based chain comprising from 1 to 10 carbon atoms) at each of its ends.

More generally, the poly(alkylene glycol) compounds used in the context of the present invention may comprise compounds made of polymerized epoxides, for example ethylene oxide (—O—$CH_2$—$CH_2$—, abbreviation: EO), propylene oxide (abbreviation: PO) and/or 1-butylene oxide (abbreviation: BO).

According to one aspect of the present invention, the poly(alkylene glycol) compound used in the continuous process of the present invention has a formula (I):

in which:
A represents a polymer chain made of:
  m alkylene oxide units of formula —O—$CH_2$—$CHR_4$— with $R_4$ representing an alkyl group comprising from 1 to 4 carbon atoms, and m ranging from 0 to 150,
  p alkylene oxide units of formula —O—$CH_2$—$CHR_5$— with $R_5$ representing an alkyl group comprising from 1 to 4 carbon atoms, and p ranging from 0 to 150,
  n ethylene oxide units —O—$CH_2$—$CH_2$— with n ranging from 1 to 150,
  m+n+p>4 and
  the alkylene oxide units of formula —O—$CH_2$—$CHR_4$—, alkylene oxide units of formula —O—$CH_2$—$CHR_5$— and the ethylene oxide units —O—$CH_2$—$CH_2$— are arranged alternately or statistically or in blocks;
$R_a$ represents a linear or branched hydrocarbon-based chain comprising from 1 to 100 carbon atoms, for example from 1 to 70, from 1 to 60, from 1 to 50 or from 1 to 30 carbon atoms.

According to another aspect of the present invention, the poly(alkylene glycol) compound used in the continuous process of the present invention has a formula (I'):

in which:
A' represents a polymer chain made of:
  m' propylene oxide units of formula —O—$CH_2$—CH(—$CH_3$)—, and m' ranging from 0 to 150, for example from 1 to 100, from 1 to 50 or from 1 to 30,
  n' ethylene oxide units —O—$CH_2$—$CH_2$— with n' ranging from 1 to 150, for example from 1 to 100, from 1 to 50 or from 1 to 30,
  m'+n'>4 and
  the propylene oxide units —O—$CH_2$—CH(—$CH_3$)— and the ethylene oxide units —O—$CH_2$—$CH_2$— are arranged alternately or statistically or in blocks;
$R'_a$ represents a linear or branched hydrocarbon-based chain comprising from 1 to 100 carbon atoms, for example from 1 to 50 or from 1 to 10 carbon atoms.

According to another aspect of the present invention, the poly(alkylene glycol) compound used in the continuous process of the present invention consists of polyethylene oxide units and/or polypropylene oxide units and have at their free end an alkyl group comprising from 1 to 4 carbon atoms, which is a linear or branched chain.

According to another embodiment, the poly(alkylene glycol) compound as represented in formulae (I) and (I') includes at least 80 mol %, for example at least 85 mol % of ethylene oxide groups. A very good equilibrium between hydrophobicity and hydrophilicity is thus obtained in the comb polymer obtained.

According to one aspect of the present invention, the esterification is performed in the presence, besides the poly(alkylene glycol) compound of formula (I) or (I'), of a poly(alkylene glycol) having a formula (II):

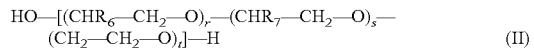

in which:
$R_6$ and $R_7$, independently of each other, represent an alkyl group comprising from 1 to 4 carbon atoms,
r and s, independently of each other, range from 0 to 150,
t ranges from 1 to 150,
r+s+t>4 and
the alkylene oxide units of formula —$CHR_6$—$CH_2$—O—, alkylene oxide units of formula —$CHR_7$—$CH_2$—O— and the ethylene oxide units —$CH_2$—$CH_2$—O— are arranged alternately or statistically or in blocks.

According to one embodiment, the poly(alkylene glycol) of formula (II) is present in a content of less than 5% by weight, relative to the total amount of the copolymer obtained on conclusion of the process, for example in a content of less than or equal to 4% by weight or 3% by weight.

According to another aspect of the present invention, the esterification is performed in the presence, besides the poly(alkylene glycol) compound of formula (I) or (I'), of a poly(alkylene glycol) having a formula (III):

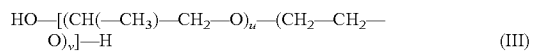

in which:
  u ranges from 0 to 150,
  v ranges from 1 to 150,
  u+v>2 and
  the propylene oxide units —O—$CH_2$—CH(—$CH_3$)— and the ethylene oxide units —O—$CH_2$—$CH_2$— are arranged alternately or statistically or in blocks.

Thus, according to this aspect of the present invention, the poly(alkylene glycol) compounds comprise polyethylene oxide units and/or polypropylene oxide units and have at their free end a hydroxide group.

Irrespective of their free end (H or alkyl), the poly(alkylene glycol) compounds used in the context of the present invention may comprise, for example, a dominant proportion of ethylene-oxy groups in combination with a secondary proportion of propylene-oxy groups. Specific examples of alkylene glycol polymer comprise: poly(alkylene glycols) with an average molecular weight of 1000, 4000, 6000 and 10 000 g/mol; polyethylene polypropylene glycols with a percentage of ethylene oxide of between 20 and 80% by weight and a percentage of propylene oxide of between 20 and 80% by weight. Such compounds are commercially available.

According to yet another aspect of the present invention, the poly(alkylene glycol) compounds comprise a mixture:
  of poly(alkylene glycol) compounds comprising polyethylene oxide units and/or polypropylene oxide units and having at their free end an alkyl group comprising from 1 to 4 carbon atoms, which is a linear or branched chain, and
  of poly(alkylene glycol) compounds comprising polyethylene oxide units and/or polypropylene oxide units and having H at their free end.

Moreover, the esterification process of the present invention proceeds in the presence of at least one poly(alkylene glycol) introduced in powder form or in molten form, for example using a hopper.

Antioxidant Agent

In the context of the present invention, the use of an antioxidant agent, also known more simply as an "antioxidant" or "heat stabilizer", made it possible to solve one of the technical problems associated with the high temperatures used in continuous processes, in particular of reactive extrusion, namely the degradation of the poly(alkylene glycol) raw materials and cleavage of the pendant chains of the comb polymer synthesized.

The use of an antioxidant agent makes it possible to maintain the expected quality of the polymer.

Moreover, despite the reticence linked to the high temperatures and the thermal degradability of poly(alkylene glycols), the minimum esterification and/or amidification temperature used in said tubular reactor, in particular the extruder, was set at 170° C., which makes it possible to considerably reduce the residence time in the reactor and thus to improve the profitability of the polymer obtained.

The mode of action of the antioxidant agents during the polymer preparation processes varies as a function of the structure and chemical composition of the antioxidant agents. Their purpose is to slow down or prevent the oxidation of the reagents or of the reaction products during the process. Generally, the antioxidant agents comprise heteroatoms, for example nitrogen atoms, which may lead to modification of the behavior of the polymers obtained in the application areas. In the context of the present invention, the purpose of the antioxidant agents is not to be integrated into the polymer of comb structure. Nevertheless, it is possible for some of these agents to remain grafted onto the polymer, exceptionally and unexpectedly. In this case, the amounts of said agents are very low.

According to one aspect of the present invention, the antioxidant used in said esterification and/or amidification process comprises an aromatic amine, a phosphine group, an organophosphate group and/or a piperidine cycle.

According to another aspect of the invention, the antioxidant is an amine bearing at least one aromatic group substituted with an alkyl chain. For example, the antioxidant comprises two aromatic groups, at least one of which is substituted with an alkyl chain containing from 3 to 9 carbon atoms. For example, it is the compound whose CAS number is 68411-46-1. Irganox™ 5057 sold by the company CIBA™ is a commercial example of such a compound.

According to yet another aspect of the invention, the antioxidant is an organophosphate compound. For example, the antioxidant is an aromatic and/or aliphatic phosphite. For example, it is the compound whose CAS number is 25550-98-5 or 101-02-0. Doverphos™ 7 and Doverphos™ 10 sold by the company DOVER™ are commercial examples of such compounds.

According to another aspect of the invention, the antioxidant is chosen from the group consisting of the trimethyl dihydroquinoline polymer, diphenylamine derivatives, phenothiazine, phenyl-alpha-naphthylamine, 4,4'-methylene-bis-2,6-di-tert-butylphenol, butylated hydroxyanisole (BHA), methoxyphenol (hydroxyanisole), dihydrobenzene (DHB), a compound of the hydroxyphenol family (for example hydroquinone or pyrocatechol) or a mixture of these agents. Such agents are commercially available.

Various Embodiments of the Esterification and/or Amidification Process

According to one embodiment of the present invention, the mole ratio between said poly(alkylene glycol) and said acidic homopolymer or copolymer ranges between 100:1 and 1:1, for example between 50:1 and 5:1 or between 25:1 and 10:1.

According to another embodiment of the present invention, the esterification and/or amidification process uses from 1% to 30% by weight of (meth)acrylic acid polymer, for example from 2% to 20% of (meth)acrylic acid polymer, and from 70% to 99% by weight of at least one poly(alkylene glycol) compound, for example from 80% to 98% of at least one poly(alkylene glycol) compound.

It is entirely possible to use an esterification and/or amidification catalyst in the context of the present invention. Use is made, for example, as esterification and/or amidification catalyst of an alkali or alkaline-earth salt of a strong protic acid, i.e. an acid that is capable of releasing protons and which has a pKa of less than 0.

For example, the catalyst is a salt of a strong protic acid comprising a hydrocarbon-based group. Mention is made more particularly of alkylsulfonic, arylsulfonic or arylalkylsulfonic acid salts, such as the sodium, potassium, lithium, calcium and magnesium salts of para-toluenesulfonic acid.

The use of a neutralized strong protic acid makes it possible to improve the rate of conversion of the poly(alkylene glycols) without chain cleavage, while at the same time having sufficient catalytic activity to promote the esterification/amidification reaction. Thus, this acid may be, for example, para-toluenesulfonic acid, methanesulfonic acid, sulfuric acid or a Lewis acid. Mention is also made of catalysts of pentavalent phosphorus type such as phosphoric acid ($H_3PO_4$), phosphorous acid ($H_3PO_3$), hypophosphorous acid ($H_3PO_2$), phenylphosphinic acid ($H_2PO_3Ph$), polyphosphoric acids such as phosphoric anhydride, tetrapolyphosphoric acid, pyrophosphoric acid ($H_4P_2O_7$), trimetaphosphoric acid, phosphoric pentachloride, a phosphorous ester such as triphenyl phosphite ($P(OPh)_3$), a hypophosphite such as ammonium hypophosphite, sodium hypophosphite, boric acid and derivatives thereof such as boric anhydride ($B_2O_3$), phosphoric anhydride ($P_2O_5$) and pyrophosphoric acid ($H_4P_2O_7$).

The esterification and/or amidification catalyst may be used in an amount of from 0.04 mol % to 10 mol %, relative to the number of acid functions, for example carboxylic acid functions, of the acid polymer.

According to one aspect of the present invention, the continuous process comprises at least the following steps:
 a) said acidic homopolymer or copolymer and said at least one poly(alkylene glycol) are mixed in molten form before introduction into said tubular reactor, in particular the extruder,
 b) the mixture from step a) is introduced into said tubular reactor, in particular the extruder,
 c) the antioxidant is introduced during step a) and/or into said tubular reactor, in particular the extruder, in one or several times, and
 d) the esterification and/or amidification of said homopolymer/copolymer is performed by reaction at elevated temperature in the tubular reactor, for example in the mixing and transportation zone of the extruder, optionally equipped with a water removal system, said esterification and/or amidification taking place at a temperature greater than or equal to 170° C., optionally in the presence of an esterification and/or amidification catalyst, optionally at reduced pressure and/or under a stream of inert gas.

In one embodiment, during step d), the mixing zone comprises homogenization of the mixture.

In one embodiment, during step d), the esterification and/or amidification of said homopolymer/copolymer is performed by kneading at elevated temperature in the mixing and transportation zone of the extruder, which is optionally equipped with a water removal system, said esterification and/or amidification taking place at a temperature greater than or equal to 170° C., optionally in the presence of an esterification and/or amidification catalyst, optionally at reduced pressure and/or under a stream of inert gas.

According to another aspect of the present invention, the continuous process comprises at least the following steps:
a) the acidic homopolymer or copolymer is introduced into the extruder, in dry form or as a solution in water, in one or several times during the process,
b) the poly(alkylene glycol) compound is introduced in solid or molten form into said tubular reactor, in particular the extruder, in one or several times during the process,
c) the antioxidant is introduced into said tubular reactor, in particular the extruder, in one or several times during the process, and
d) the esterification and/or amidification of said homopolymer/copolymer is performed by reaction at elevated temperature in the tubular reactor, for example in the mixing and transportation zone of the extruder, which is optionally equipped with a water removal system, said esterification and/or amidification taking place at a temperature greater than or equal to 170° C., optionally in the presence of an esterification and/or amidification catalyst, optionally at reduced pressure and/or under a stream of inert gas.

In one embodiment, during step d), the mixing zone comprises homogenization of the mixture.

In one embodiment, during step d), the esterification and/or amidification of said homopolymer/copolymer is performed by kneading at elevated temperature in the mixing and transportation zone of the extruder, which is optionally equipped with a water removal system, said esterification and/or amidification taking place at a temperature greater than or equal to 170° C., optionally in the presence of an esterification and/or amidification catalyst, optionally at reduced pressure and/or under a stream of inert gas.

Comb Polymer Obtained Via the Continuous Esterification and/or Amidification Process Another subject of the present invention relates to the polymer, bearing a hydrocarbon-based chain and poly(oxyalkyl) side groups, also known as the comb polymer, which may be obtained via the continuous process described previously.

According to one aspect of the present invention, said polymer bearing a hydrocarbon-based chain and poly(oxyalkyl) side groups obtained via the continuous esterification and/or amidification process has a molecular weight Mw of between 15 000 and 400 000 g/mol, for example between 20 000 and 200 000 g/mol, between 25 000 and 150 000 g/mol or between 30 000 and 125 000 g/mol.

According to one aspect of the present invention, this polymer has a polydispersity index IP of less than 2.5, for example less than 2.

According to one aspect of the present invention, this polymer has a polydispersity index IP of less than 2.5, for example less than 2 or 1.6.

Despite the high temperatures used, the process of the present invention in fact makes it possible to obtain a comb polymer having a low polydispersity index IP. The technical characteristics of the process are such that the degree of degradation of the side chains and the degree of crosslinking are in fact very low. The process of the present invention thus makes it possible to obtain a polymer of better quality, while at the same time improving the production yield.

Thus, according to an embodiment of the present invention, the comb polymer thus obtained is characterized in that it has a degree of polymeric purity such that the content of free poly(alkylene glycol) is less than 15% by weight (relative to the total weight introduced into the reactor), as measured by SEC (see the details below).

According to another embodiment of the present invention, the comb polymer thus obtained is characterized in that it has a degree of polymeric purity such that the content of free poly(alkylene glycol) is less than 13% by weight (relative to the total weight introduced into the reactor), as measured by HPLC.

Size exclusion chromatography (SEC) or gel permeation chromatography (GPC) moreover makes it possible to measure the molecular mass of the highest peak Mp (or "peak molecular weight Mp").

The molecular masses Mp are expressed in g/mol.

In the context of the present invention, the measured ratio molecular mass Mp/theoretical molecular mass Mp ratio may be calculated. Calculation of such a ratio makes it possible especially to evaluate the efficiency of the process of the present invention.

The molecular mass Mp of the comb polymer (CP) obtained via the process of the present invention is measured by SEC. This magnitude is referred to as $\text{Mpm}_{CP}$ in the context of the present invention.

The theoretical molecular mass Mp of the comb polymer (CP) is calculated according to the following formula. This magnitude is referred to as $\text{Mpt}_{CP}$ in the context of the present invention.

Calculation of the theoretical molecular mass Mp of the comb polymer (CP) is performed according to the following formula:

$$Mpt_{CP} = Mp_{PAL} + Mp_{PAG}\left(\frac{N_{PAG} - N_{res}}{N_{PAL}}\right)$$

in which:
$\text{Mpt}_{CP}$ is the theoretical molecular mass Mp of the comb polymer (CP),
$\text{Mp}_{PAL}$ is the molecular mass Mp of the acidic polymer (PAL),
$\text{Mp}_{PAG}$ is the molecular mass Mp of the poly(alkylene glycols) (PAG),
$N_{PAL}$ is the number of moles of acidic polymers introduced into the reactor,
$N_{PAG}$ is the number of moles of poly(alkylene glycol) introduced into the reactor,
$N_{res}$ is the number of residual moles of poly(alkylene glycol) measured by SEC at the reactor outlet.

According to one embodiment, the comb polymer obtained is such that the measured Mp/theoretical Mp ratio is between 0.3 and 3, for example between 0.5 and 2.

According to yet another embodiment, the comb polymer obtained is such that the measured Mp/theoretical Mp ratio is between 0.8 and 1.2, for example between 0.85 and 1.15 or between 0.9 and 1.1.

According to yet another embodiment, the comb polymer obtained is such that the $\text{Mpm}_{CP}/\text{Mpt}_{CP}$ ratio is between 0.8 and 1.2.

The inventors have in fact realized that, according to these embodiments, the process conditions are such that the process tends toward a degree of use of the poly(alkylene glycols) introduced into the extruder of close to 100%. Furthermore, it is ensured that the degree of degradation of these poly(alkylene glycols), and also of the pendant chains grafted onto the acidic polymer, tends toward 0%. Furthermore, the thermal crosslinkings inducing crosslinkings are limited, which is such that the measured Mp tends toward the theoretical Mp when the degree of grafting of the poly(alkylene glycols) tends toward 100%.

The comb polymer thus obtained may be used as adjuvant for a hydraulic composition.

In order to facilitate its use and metering, the adjuvant may be in the form of a solution in a suitable solvent. Preferably, the suitable solvent comprises or is made of water. In certain cases, the addition of another solvent, such as an alcohol or a glycol, may be envisaged in addition or alternatively, for example to facilitate the dissolution. The polymer concentration of the adjuvant depends mainly on the intended application area. Generally, the formulation of the adjuvant comprises 1 to 50% by weight, preferably 10 to 40% by weight of polymer relative to the total weight.

Process for Preparing the Comb Polymer by Polymerization Followed by Esterification/Amidification Another subject of the present invention relates to a process for preparing a comb polymer, said process comprising the following steps:
  a) preparation of an acidic homopolymer or copolymer, for example a (meth)acrylic acid homopolymer or copolymer, by controlled radical polymerization,
  b) continuous esterification/amidification of said acidic homopolymer or copolymer obtained according to step a), as described above, in the presence of at least one poly(alkylene glycol) in solid or molten form and of an antioxidant, to obtain said comb polymer,
  c) optionally, dissolution of the comb polymer obtained according to step b),
  d) optionally, total or partial neutralization of the comb polymer obtained according to step b) and/or c),
  e) optionally, forming into powder of the comb polymer obtained according to step b) and/or c) and/or d).

Thus, according to step a) of this process, said acidic homopolymer or copolymer is prepared by controlled radical polymerization, as described above.

According to one embodiment of the present invention, in said process for preparing a comb polymer, the dissolution step c) and neutralization step d) are combined. Thus, said process comprises the following steps:
  a) preparation of an acidic homopolymer or copolymer, for example a (meth)acrylic acid homopolymer or copolymer, by controlled radical polymerization,
  b) continuous esterification/amidification of said acidic homopolymer or copolymer obtained according to step a), as described above, in the presence of at least one poly(alkylene glycol) in solid or molten form and of an antioxidant, to obtain said comb polymer,
  c') dissolution and neutralization of the comb polymer obtained according to step b),
  d') optionally, forming into powder of the comb polymer obtained according to step c').

Comb Polymer Obtained Via the Polymerization Process Followed by Continuous Esterification/Amidification Another subject of the present invention concerns a polymer bearing a hydrocarbon-based chain and poly(oxyalkyl) side groups, also known as a comb polymer, which may be obtained via the process of polymerization and esterification and/or amidification described previously.

A subject of the present invention is also the dispersant additive for a hydraulic composition comprising the comb polymer, as described above, which may be obtained via the process of polymerization and esterification/amidification described previously.

Finally, a subject of the present invention is the use of a polymer, also known as a comb polymer, which may be obtained via the process of polymerization and esterification/amidification described previously, for reducing the water content of hydraulic compositions.

The examples that follow allow the present invention to be better understood, without limiting its scope.

EXAMPLES

Acidic Homopolymer or Copolymer Molecular Weight Mw and Mp

Such a technique uses a WATERS™ brand liquid chromatography machine equipped with a detector. This detector is a WATERS™ brand refractometric concentration detector.

This liquid chromatography machine is equipped with a size exclusion column suitably chosen by a person skilled in the art so as to separate the various molecular weights of the polymers studied. The liquid elution phase is an aqueous phase adjusted to pH 9 with IN sodium hydroxide containing 0.05M of $NaHCO_3$, 0.1M of $NaNO_3$, 0.02M of triethanolamine and 0.03% of $NaN_3$.

In detailed manner, according to a first step, the polymerization solution is diluted to 0.9% dry in the SEC dissolution solvent, which corresponds to the liquid elution phase for the
SEC to which is added 0.04% of dimethylformamide which acts as flow rate marker or internal standard. The solution is then filtered through a 0.2 μm filter. 100 μL are then injected into the chromatography machine (eluent: an aqueous phase adjusted to pH 9.00 with 1N sodium hydroxide containing 0.05M of $NaHCO_3$, 0.1M of $NaNO_3$, 0.02M of triethanolamine and 0.03% of $NaN_3$).

The liquid chromatography machine contains an isocratic pump (WATERS™ 515) whose flow rate is set at 0.8 ml/min. The chromatography machine also comprises an oven which itself comprises in series the following column system: a precolumn of WATERS™ ULTRAHYDROGEL GUARD COLUMN type 6 cm long and of inside diameter 40 mm, and a WATERS™ ULTRAHYDROGEL type column 30 cm long and of inside diameter 7.8 mm. The detection system is composed of a WATERS™ RI 410 type refractometric detector. The oven is brought to a temperature of 60° C. and the refractometer is brought to a temperature of 45° C.

The chromatography machine is calibrated with sodium polyacrylate powder standards of different molecular masses certified by the supplier: POLYMER STANDARDS SERVICE or AMERICAN POLYMER STANDARDS CORPORATION.

Comb Polymer Molecular Weight Mw and Mp

In each of the following examples, the molecular mass of the comb polymers according to the invention is determined by SEC.

Such a technique uses a WATERS™ brand liquid chromatography machine equipped with two detectors, one of which combines static light scattering at an angle of 90° with viscometry measured by a MALVERN™ detector and the other being a WATERS™ brand refractometric concentration detector.

This liquid chromatography machine is equipped with size exclusion columns suitably chosen by a person skilled in the art so as to separate the various molecular weights of the polymers studied. The liquid elution phase is an aqueous phase containing 1% of $KNO_3$. In detailed manner, the polymerization solution is diluted to 0.9% dry in the SEC eluent, and is then filtered through a 0.2 μm filter. 100 μL are then injected into the SEC machine. The SEC eluent is a 1% $KNO_3$ solution. The liquid chromatography machine contains an isocratic pump (Waters 515) whose flow rate is set at 0.8 ml/min, an oven containing in series the following column system: a WATERS™ ULTRAHYDROGEL GUARD COLUMN type precolumn 6 cm long and of inside diameter 40 mm, a WATERS™ ULTRAHYDROGEL type column 30 cm long and of inside diameter 7.8 mm and two WATERS™ 120 ANGSTROM ULTRAHYDROGEL columns 30 cm long and of inside diameter 7.8 mm, followed in parallel by the detection system: on one side a refractometric detector of WATERS™ RI 410 type and on the other side a dual detector of viscometer and light scattering at an angle of 90° of MALVERN™ DUAL DETECTOR 270 type. The oven is brought to a temperature of 55° C. and the refractometer is brought to a temperature of 45° C.

The SEC machine is calibrated by calibration of universal/multidetector type with a single PEO 19k standard of MALVERN™ PolyCAL™ type, the following characteristics of which are known: concentration, IV, Mw, Mn, PI, thus making it possible to calibrate each detector.

Acid Index of a Polymer

The acid index of the polymer is determined by acid-base metering by dissolving 1 g of polymer in 100 g of methanol and then titrating the solution with aqueous 1N KOH solution using an automatic titrator.

The acid index is measured in mg KOH/g, i.e. in mass of KOH required to neutralize the acidity of the polymer.

Content of Free poly(alkylene glycol)

Determined by SEC as described above.

Example 1

This example illustrates the condensation by reactive extrusion of a methacrylic acid homopolymer with a methoxy poly(ethylene glycol) (MPEG) of molecular weight 5000 g/mol (commercially available).

A TSA® brand co-rotating twin-screw extruder is used, the geometrical parameters of which are as follows:

Diameter=26 mm and length/diameter ratio=80, equipped with a gas evacuation device.

The flow rates of introduction of the reagents into the extruder are set so that the masses introduced are proportional to the following values:

1.063 kg of a methacrylic acid homopolymer (Mp=7700 g/mol; Mw=10 000 g/mol, IP=3) in powder form,
4.899 kg of methoxy poly(ethylene glycol) of molecular weight 5000 g/mol in molten liquid form at 80° C.,
14.8 g of lithium hydroxide (esterification catalyst), and
12 g of Irganox® 5057 antioxidant.

The flow rates are then proportionally modified so as to adjust the residence time in the extruder. Said residence time is measured by adding a colored tracer. Thus, the mole ratio between MPEG and the acidic homopolymer is 7.1:1.

The extruder comprises a reaction zone whose temperature is set at 220° C. The flow rate is set so that the residence time of the reagents and products in the extruder is 25 minutes±1.

The product obtained at the extruder outlet is in the form of a molten resin.

The product is then dissolved by adding water and then neutralized by adding NaOH (50%) to pH=8.5.

Characterization of the Polymer Obtained

Acid index=89 mg KOH/g.
$Mpm_{CP}$=40 300 g/mol.
$Mpt_{CP}$=35 617 g/mol.
Ratio $Mpm_{CP}/Mpt_{CP}$=1.13.
IP=1.6.
Mw=190 300 g/mol.
Content of free MPEG at the reactor outlet=13.4%.

Example 2

This example illustrates the condensation by reactive extrusion of a methacrylic acid homopolymer with a methoxy poly(ethylene glycol) (MPEG) of molecular weight 2000 g/mol (commercially available).

The ingredients are introduced continuously into a TSA® brand co-rotating twin-screw extruder (diameter=26 mm and length/diameter ratio=80, equipped with a gas evacuation device).

The flow rates of introduction of the reagents into the extruder are set such that the masses introduced are proportional to the following values:

1.33 kg of a methacrylic acid homopolymer (Mp=7700 g/mol; Mw=10 000 g/mol, IP=3) in powder form,
4.64 kg of methoxy poly(ethylene glycol) of molecular weight 2000 g/mol in molten liquid form at 80° C.,
21 g of lithium hydroxide, and
18 g of Irganox® 5057 antioxidant.

The flow rates are then proportionally modified so as to adjust the residence time in the extruder. Said residence time is measured by adding a colored tracer. Thus, the mole ratio between MPEG and the acidic homopolymer is 13.4:1.

The extruder comprises a reaction zone whose temperature is set at 220° C. The flow rate is set so that the residence time of the reagents and products in the extruder is 24 minutes±1. The product obtained at the extruder outlet is in the form of a molten resin. The product is then dissolved by adding water and neutralized with sodium hydroxide (50%) to obtain a solids content of 41.1% by weight.

Characterization of the Polymer Obtained $Mpm_{CP}$=45 000 g/mol.
$Mpt_{CP}$=29 300 g/mol.
Ratio $Mpm_{CP}/Mpt_{CP}$=1.5.
IP=1.9.
Mw=88 000 g/mol.
Acid index=126 mg KOH/g.
Content of free MPEG at the reactor outlet=3.2%.

Example 3

This example illustrates the condensation by reactive extrusion of a methacrylic acid homopolymer with a methoxy poly(ethylene glycol) (MPEG) of molecular weight 2000 g/mol (commercially available).

The ingredients are introduced continuously into a TSA® brand co-rotating twin-screw extruder (diameter=26 mm and length/diameter ratio=80, equipped with a gas evacuation device).

The flow rates of introduction of the reagents into the extruder are set such that the masses introduced are proportional to the following values:

1.82 kg of a methacrylic acid homopolymer (Mp=7700 g/mol; Mw=10 000 g/mol, IP=3) in powder form,
4.186 kg of methoxy poly(ethylene glycol) of molecular weight 2000 g/mol in molten liquid form at 80° C.,
10 g of Irganox® 5057 antioxidant.

The flow rates are then proportionally modified so as to adjust the residence time in the extruder. Said residence time is measured by adding a colored tracer. Thus, the mole ratio between MPEG and the acidic homopolymer is 8.8:1. The extruder comprises a reaction zone whose temperature is set at 220° C. The flow rate is set so that the residence time of the reagents and products in the extruder is 30 minutes±1.

The product obtained at the extruder outlet is in the form of a molten resin. The product is then dissolved by adding water and neutralized with sodium hydroxide (50%) to obtain a solids content of 40.4% by weight.
Characterization of the Polymer Obtained
  $Mpm_{CP}$=41 000 g/mol.
  $Mpt_{CP}$=23 662 g/mol.
  Ratio $Mpm_{CP}/Mpt_{CP}$=1.7.
  IP=1.8.
  Content of free MPEG at the reactor outlet=13%.
  Acid index=165 mg KOH/g.

Example 4

This example illustrates the condensation by reactive extrusion of a methacrylic acid homopolymer with a methoxy poly(ethylene glycol) (MPEG) of molecular weight 5000 g/mol (commercially available).

The ingredients are introduced continuously into a TSA® brand co-rotating twin-screw extruder (diameter=26 mm and length/diameter ratio=80, equipped with a gas evacuation device).

The flow rates of introduction of the reagents into the extruder are set such that the masses introduced are proportional to the following values:
  0.42 kg of a methacrylic acid homopolymer (Mp=7700 g/mol; Mw=10 000 g/mol, IP=3) in powder form,
  5.54 kg of methoxy poly(ethylene glycol) of molecular weight 5000 g/mol in molten liquid form at 80° C.,
  14 g of lithium hydroxide, and
  12 g of Irganox® 5057 antioxidant.

The flow rates are then proportionally modified so as to adjust the residence time in the extruder. Said residence time is measured by adding a colored tracer. Thus, the mole ratio between MPEG and the acidic homopolymer is 20:1. The extruder comprises a reaction zone whose temperature is set at 220° C. The flow rate is set so that the residence time of the reagents and products in the extruder is 30 minutes±1.

The product obtained at the extruder outlet is in the form of a molten resin. The product is then dissolved by adding water and neutralized with sodium hydroxide (50%) to obtain a solids content of 40.3% by weight.
Characterization of the Polymer Obtained
  $Mpm_{CP}$=147 000 g/mol.
  $Mpt_{CP}$=86 070 g/mol.
  Ratio $Mpm_{CP}/Mpt_{CP}$=1.7.
  IP=1.7.
  Mw=103 000 g/mol.
  Content of free MPEG at the reactor outlet=15%.
  Acid index=39 mg KOH/g.

Example 5

This example illustrates the condensation by reactive extrusion of an acrylic acid homopolymer with a methoxy poly(ethylene glycol) (MPEG) of molecular weight 2000 g/mol (commercially available).

The ingredients are introduced continuously into a TSA® brand co-rotating twin-screw extruder (diameter=26 mm and length/diameter ratio=80, equipped with a gas evacuation device).

The flow rates of introduction of the reagents into the extruder are set such that the masses introduced are proportional to the following values:
  1.23 kg of an acrylic acid homopolymer (Mp=12 000 g/mol; IP=2.8) in powder form,
  4.72 kg of methoxy poly(ethylene glycol) of molecular weight 2000 g/mol in molten liquid form at 80° C.,
  26 g of lithium hydroxide, and
  21 g of Irganox® 5057 antioxidant.

The flow rates are then proportionally modified so as to adjust the residence time in the extruder. Said residence time is measured by adding a colored tracer. The extruder comprises a reaction zone whose temperature is set at 220° C. The flow rate is set so that the residence time of the reagents and products in the extruder is 30 minutes±1.

The product obtained at the extruder outlet is in the form of a molten resin. The product is then dissolved by adding water and neutralized with sodium hydroxide (50%) to obtain a solids content of 39.3% by weight.
Characterization of the Polymer Obtained
  $Mpm_{CP}$=55 000 g/mol.
  $Mpt_{CP}$=63 000 g/mol.
  Ratio $Mpm_{CP}/Mpt_{CP}$=0.9.
  IP=1.5.
  Content of free MPEG at the reactor outlet=9%.
  Acid index=136 mg KOH/g.

Example 6

This example describes the use of the polymers obtained according to Examples 1 to 5 in a mortar composition whose constitution is given in Table 1 below. The workability of the composition is measured at TO. It is demonstrated that the polymers prepared according to the process of the present invention may be called water reducers.

Measurement of the Workability of the Mortar (Slump)

The workability measurements, also known as slump measurements, are performed at room temperature, using a bottomless cone, of frustoconical shape, made of galvanized steel, known as an Abrams mini-cone. This cone has the following characteristics:
  Upper diameter: 50±2 mm.
  Lower diameter: 100±2 mm.
  Height: 150±2 mm.

The cone is set on a plate moistened with a sponge.

The cone is then filled with a determined amount of each of the preparations. The filling lasts 2 minutes. The content of the cone is packed using a metal rod.

Measurement of the Air Capture

The air capture measurement is made according to standard EN 12350-7, paragraph 3.3.

Mortar Tests

Examples 1 to 5 are tested on a mortar formulation according to standard EN 196-1 by mixing under stirring of standardized sand (EN 196-1), cement (CEM I 52.5 N), water and a dispersant additive according to the invention. The proportions are given in Table 1 below.

TABLE 1

| | Test | | | | | |
|---|---|---|---|---|---|---|
| | Reference mortar 1-1 Ref | 1-2 Inv | 1-3 Inv | 1-4 Inv | 1-5 Inv | 1-6 Inv |
| Sand (g) | 2700 | 2700 | 2700 | 2700 | 2700 | 2700 |
| Cement (g) | 900 | 900 | 900 | 900 | 900 | 900 |
| Additive in unmodified form (g) | | 4.22 | 4.33 | 4.3 | 4.25 | 4.3 |

TABLE 1-continued

| | Test | | | | | |
|---|---|---|---|---|---|---|
| | Reference mortar 1-1 Ref | 1-2 Inv | 1-3 Inv | 1-4 Inv | 1-5 Inv | 1-6 Inv |
| Water (g) | 560 | 420 | 454 | 430 | 465 | 425 |
| % dry additive/cement | | 0.19 | 0.19 | 0.19 | 0.19 | 0.19 |

The workability is measured at T0 by using the test described in the preamble suitable for mortar (Abrams mini-cone) and the air capture of each of the mortar preparations is measured. The results obtained are presented in Table 2 below.

TABLE 2

| | Test | | | | | |
|---|---|---|---|---|---|---|
| | Reference mortar 1-1 Ref | 1-2 Inv | 1-3 Inv | 1-4 Inv | 1-5 Inv | 1-6 Inv |
| Workability T0 (mm) | 290 | 300 | 280 | 290 | 270 | 310 |
| Water reduction (%) | | 25 | 19 | 23 | 17 | 24 |
| Air capture (%) | 2.8 | 3.5 | 3.2 | 3.5 | 3.6 | 3.4 |

Test 1-1 is a negative reference. It illustrates a reference mortar composition without admixture, i.e. without dispersant additive according to the invention.

In tests 1-2 to 1-6 according to the invention, the use of a dispersant additive makes it possible to reduce the amount of water in the hydraulic composition by maintaining an initial workability similar to that of the negative reference. The dispersant additive may be called as a high water reducer in accordance with standard ADJUVANT NF EN 934-2 according to which the term "high water reducer" or "superplasticizer" defines an admixture which allows a water reduction for admixture concrete ≥12% relative to the reference concrete.

It should be noted that the air capture percentages measured for tests 1-2 to 1-6, although higher than the reference 1-1, are entirely acceptable given the presence of the polymer in the formulations.

The invention claimed is:

1. A continuous process for preparing a comb polymer, without organic solvent, by esterification and/or amidification of an acidic homopolymer or copolymer, the process comprising:
performing the esterification and/or amidification of said homopolymer/copolymer by reaction at elevated temperature in a mixing and transportation zone of a tubular reactor, optionally equipped with a water removal system, in the presence of at least one poly(alkylene glycol) in solid form or in molten form and of an antioxidant, said esterification and/or amidification taking place at a temperature of greater than or equal to 170° C., optionally in the presence of an esterification and/or amidification catalyst, optionally at reduced pressure and/or under a stream of inert gas,
wherein said acidic homopolymer or copolymer to be esterified and/or amidated is an acrylic acid and/or methacrylic acid polymer with a molecular weight Mw of between 1,000 and 20,000 g/mol, as determined by GPC.

2. The continuous process according to claim 1, wherein said acidic homopolymer or copolymer results from the polymerization or copolymerization of at least one of the monomers chosen from the group consisting of acrylic acid, methacrylic acid, itaconic acid, crotonic acid, fumaric acid and maleic anhydride.

3. The continuous process according to claim 1, according to which said poly(alkylene glycol) has a formula (I):

$$R_a\text{-A-OH} \qquad (I)$$

wherein:
A represents a polymer chain comprising:
m alkylene oxide units of formula —O—CH$_2$—CHR$_4$— with R$_4$ representing an alkyl group comprising from 1 to 4 carbon atoms, and m ranging from 0 to 150,
p alkylene oxide units of formula —O—CH$_2$—CHR$_5$— with R$_5$ representing an alkyl group comprising from 1 to 4 carbon atoms, and p ranging from 0 to 150,
n ethylene oxide units —O—CH$_2$—CH$_2$— with n ranging from 1 to 150,
m+n+p >4 and
the alkylene oxide units of formula —O—CH$_2$—CHR$_4$—, alkylene oxide units of formula —O—CH$_2$—CHR$_5$— and the ethylene oxide units —O—CH$_2$—CH$_2$— are arranged alternately or statistically or in blocks; and
R$_a$ represents a linear or branched hydrocarbon-based chain comprising from 1 to 100 carbon atoms.

4. The continuous process according to claim 3, wherein the esterification and/or amidification is performed in the further presence of a poly(alkylene glycol) having a formula (II):

$$HO—[(CHR_6—CH_2—O)_r(CHR_7—CH_2—O)_s—(CH_2—CH_2—O)_t]—H \qquad (II)$$

wherein:
R$_6$ and R$_7$, independently of each other, represent an alkyl group comprising from 1 to 4 carbon atoms,
r and s, independently of each other, range from 0 to 150,
t ranges from 1 to 150,
r+s+t >4 and
the alkylene oxide units of formula —CHR$_6$—CH$_2$—O—, alkylene oxide units of formula —CHR$_7$—CH$_2$—O— and the ethylene oxide units —CH$_2$—CH$_2$—O— are arranged alternately or statistically or in blocks.

5. The continuous process according to claim 4, wherein the poly(alkylene glycol) of formula (II) is present in a content of less than 5% by weight, relative to the total amount of the comb polymer obtained at the outcome of the process.

6. The continuous process according to claim 1, wherein said acidic homopolymer or copolymer to be esterified and/or amidated is in the form of an aqueous solution.

7. The continuous process according to claim 1, wherein said acidic homopolymer or copolymer to be esterified and/or amidated is in dry form.

8. The continuous process according to claim 1, wherein said acidic homopolymer or copolymer has a polydispersity index IP (ratio Mw/Mn) of between 1.5 and 3.

9. The continuous process according to claim 1, wherein the antioxidant comprises an aromatic amine, a phosphine group, an organophosphate group and/or a piperidine cycle.

10. The continuous process according to claim 1, wherein a mole ratio between said poly(alkylene glycol) and said acidic homopolymer or copolymer ranges between 100:1 and 1:1.

11. The continuous process according to claim 1, wherein the tubular reactor comprises several reaction zones with different temperatures ranging between room temperature and 250° C., at least one reaction zone of which having a temperature greater than or equal to 170° C.

12. The continuous process according to claim 1, comprising:
   a) mixing said acidic homopolymer or copolymer and said at least one poly(alkylene glycol) in molten form before introduction into the tubular reactor to obtain a mixture,
   b) introducing the mixture from a) into the tubular reactor,
   c) introducing the antioxidant during a) and/or into the tubular reactor in one or several times, and
   d) performing the esterification and/or amidification of said homopolymer/copolymer by kneading at elevated temperature in the mixing and transportation zone of the tubular reactor, which is optionally equipped with a water removal system, said esterification and/or amidification taking place at a temperature greater than or equal to 170° C., optionally in the presence of an esterification and/or amidification catalyst, optionally at reduced pressure and/or under a stream of inert gas.

13. The continuous process according to claim 1, wherein the tubular reactor is an extruder.

14. A process for preparing a comb polymer, said process comprising:
   a) preparing an acidic homopolymer or copolymer by controlled radical polymerization,
   b) performing the process according to claim 1, which comprises continuous esterification/amidification of said homopolymer/copolymer obtained according to a), in the presence of at least one poly(alkylene glycol) in solid or molten form and of an antioxidant,
   c) optionally, performing dissolution of the polymer obtained in b),
   d) optionally, performing total or partial neutralization of the polymer obtained in b) and/or c), and
   e) optionally, forming into powder of the polymer obtained in b) and/or c) and/or d).

15. A continuous process for preparing a comb polymer, without organic solvent, by esterification and/or amidification of an acidic homopolymer or copolymer, the process comprising:
   a) mixing said acidic homopolymer or copolymer and said at least one poly(alkylene glycol) in molten form before introduction into the tubular reactor to obtain a mixture,
   b) introducing the mixture from a) into the tubular reactor,
   c) introducing the antioxidant during a) and/or into the tubular reactor in one or several times, and
   d) performing the esterification and/or amidification of said homopolymer/copolymer by kneading at elevated temperature in the mixing and transportation zone of the tubular reactor, which is optionally equipped with a water removal system, said esterification and/or amidification taking place at a temperature greater than or equal to 170° C., optionally in the presence of an esterification and/or amidification catalyst, optionally at reduced pressure and/or under a stream of inert gas.

16. The process according to claim 15, wherein said acidic homopolymer or copolymer to be esterified and/or amidated is in the form of an aqueous solution.

17. A continuous process for preparing a comb polymer, without organic solvent, by esterification and/or amidification of an acidic homopolymer or copolymer, the process comprising:
   performing the esterification and/or amidification of said homopolymer/copolymer by reaction at elevated temperature in a mixing and transportation zone of a tubular reactor, optionally equipped with a water removal system, in the presence of at least one poly(alkylene glycol) in solid form or in molten form and of an antioxidant, said esterification and/or amidification taking place at a temperature of greater than or equal to 170° C., optionally in the presence of an esterification and/or amidification catalyst, optionally at reduced pressure and/or under a stream of inert gas,
   wherein a mole ratio between said poly(alkylene glycol) and said acidic homopolymer or copolymer ranges between 100:1 and 1:1.

* * * * *